United States Patent [19]

Brady

[11] Patent Number: 5,780,087

[45] Date of Patent: Jul. 14, 1998

[54] APPARATUS AND METHOD FOR FROTHING LIQUIDS

[76] Inventor: Frank A. Brady, 3166 Blackhawk Meadows Dr., Danville, Calif. 94506

[21] Appl. No.: 717,764

[22] Filed: Sep. 23, 1996

[51] Int. Cl.⁶ .................................................. A23C 23/00
[52] U.S. Cl. ........................ 426/474; 426/519; 426/564; 426/569; 426/570
[58] Field of Search .................................. 426/312, 317, 426/474, 519, 590, 564, 569, 570; 366/256

[56] References Cited

U.S. PATENT DOCUMENTS

| | | | |
|---|---|---|---|
| D. 52,019 | 5/1918 | Biette | D7/310 |
| D. 181,143 | 10/1957 | Gundelfinger | D7/317 X |
| D. 228,823 | 10/1973 | Oelschlaeger | D7/397 |
| D. 342,414 | 12/1993 | Jorgensen | D7/317 |
| D. 343,763 | 2/1994 | Zimmerman | D7/548 |
| D. 372,627 | 8/1996 | Ireland | D7/319 |
| 548,712 | 10/1885 | Laney | 366/333 X |
| 1,637,103 | 7/1927 | Corwin | 366/130 |
| 1,998,692 | 4/1935 | Van Rossem et al. | 259/113 |
| 2,053,021 | 9/1936 | Cassol | 53/3 |
| 2,221,486 | 8/1940 | Zoia | 53/3 |
| 2,291,708 | 8/1942 | Gluck | 259/113 |
| 2,481,352 | 9/1949 | Sabatella | 259/113 |
| 2,726,071 | 12/1955 | Bernhardt | 259/113 |
| 2,900,896 | 8/1959 | Bondanini | 99/297 |
| 2,935,928 | 5/1960 | Keating et al. | 99/287 |
| 3,137,228 | 6/1964 | Elow | 99/287 |
| 3,307,474 | 3/1967 | Kasher | 99/287 |
| 3,546,129 | 12/1970 | Berg et al. | 252/359 |
| 3,927,608 | 12/1975 | Doyel | 99/297 |
| 4,010,934 | 3/1977 | McCord et al. | 259/116 |
| 4,650,583 | 3/1987 | Bondanini | 210/474 |
| 4,676,655 | 6/1987 | Handler | 366/130 |
| 4,737,036 | 4/1988 | Offerman | 366/130 |

(List continued on next page.)

FOREIGN PATENT DOCUMENTS

| | | |
|---|---|---|
| 384589 | 12/1931 | Belgium . |
| 408126 | 3/1935 | Belgium . |
| 167423 | 1/1986 | European Pat. Off. . |
| 642130 | 8/1928 | France . |
| 965122 | 9/1950 | France . |
| 1055182 | 2/1954 | France . |
| 333081 | 4/1919 | Germany . |
| 4239380 A1 MI | 1/1994 | Germany . |
| 94/U00071 | 11/1994 | Italy . |
| 165229 | 6/1921 | United Kingdom . |
| 237660 | 8/1925 | United Kingdom . |
| 363543 | 12/1931 | United Kingdom . |
| 395548 | 7/1933 | United Kingdom . |

OTHER PUBLICATIONS

Italian Utility Model Application No. MI94/U000771.

*Primary Examiner*—Milton Cano
*Attorney, Agent, or Firm*—Limbach & Limbach L.L.P.

[57] ABSTRACT

An improved method for using the same is disclosed which permits the frothing of a liquid, such as milk, without the need for the traditional steam and/or electricity. In one embodiment of the invention, the apparatus has a container for holding the liquid, a cylindrical element, such as a rod, which extends vertically through the container's lid for the length of the container and terminating in a plunger device which is used to rapidly pump and agitate the liquid in the container to accomplish the frothing of the liquid. The preferred embodiment of the plunger has at least three main parts which includes a top plate and a base plate which are connected with a screen between them for permitting the flow through of the liquid. Also, between the top and bottom plates of the plunger is a spring which is positioned about the outer edges of the screen to bias the screen in close contact with the inner wall of the container, such that the plunger will move slidably along the inner wall of the container when the plunger is moving rapidly through the container of liquid to froth the liquid. The plunger and its components (except for the screen) have a diameter which is slightly less than the inside diameter of the container such that the plunger can slidably move along, and in contact with, the inner wall of the container when the plunger is in motion.

7 Claims, 3 Drawing Sheets

U.S. PATENT DOCUMENTS

| | | | |
|---|---|---|---|
| 4,946,286 | 8/1990 | Purkapile | 366/247 |
| 5,154,110 | 10/1992 | Chang | 99/281 |
| 5,284,389 | 2/1994 | Lumsden | 366/256 |
| 5,441,752 | 8/1995 | Sandin | 426/82 |
| 5,461,968 | 10/1995 | Portman | 99/287 |
| 5,478,586 | 12/1995 | Connor | 426/431 |
| 5,498,757 | 3/1996 | Johnson et al. | 426/520 |
| 5,580,169 | 12/1996 | Ghidini | 366/256 |

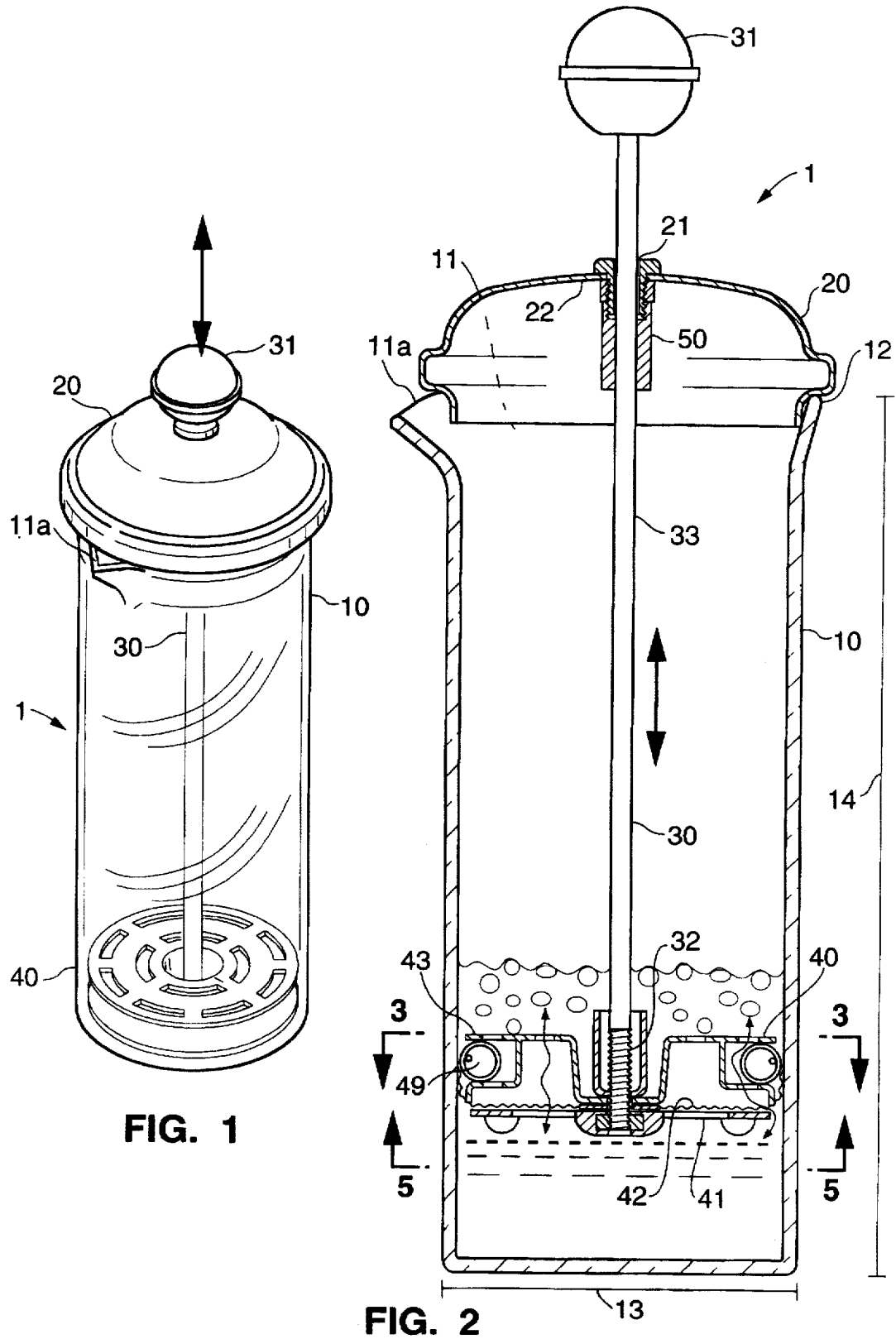

APPARATUS AND METHOD FOR FROTHING LIQUIDS

BACKGROUND OF THE INVENTION

1. Field of the Invention

The present invention relates to a new and improved method and apparatus for frothing liquids, such as milk. In particular, the invention relates to an apparatus and method for frothing which allows the user to obtain foamy, frothed milk without the use of a complicated steamer device.

2. Discussion of the Prior Art

For many years there have been a variety of steamers used to foam or froth milk. Most of the prior art foaming devices are complicated machines which involve the use of steam to aerate or foam the liquid. Most of these devices involve at least a steam generator which provides superheated steam and an air channel which provides air flow. The steam and air are mixed in the pipes, and output through a single tube which is normally positioned to be placed into a container of milk. When the steam and air are discharged from the tube into the milk, the frothing process begins. After a time, the steam and air froth the milk to the desired consistency, and the user is able to use the frothed milk. However, the froth must be used within a relatively short period of time because its life is limited because of the water content which is left from the use of the steam to accomplish the frothing.

Coffee drinks requiring frothed milk, such as cappuccino, have become much more popular in recent years, increasing the need for milk frothing devices. However, milk frothers have not departed significantly from the standard steam-infusion type machines. No real efforts have been made to make them easier to use or more accessible to the general public.

One disadvantage of the prior art devices (in addition to their complex nature described above) is that they are often large and unwieldy, possessing a number of tubes or pipes through which the pressurized steam is injected into the milk. These large and unwieldy devices are expensive to make and purchase, and take up a significant amount of counter or storage space. Moreover, one does not always have the time or inclination to set up and wait for the cumbersome steaming devices to work. As a result, a consumer will often forego the desire to have one of these ever popular coffee drinks requiring frothed milk, and will simply settle for something else.

The prior art devices also require an energy source to create the pressurized steam, and are therefore limited to being positioned near an energy source such as a wall outlet. Such a requirement will usually preclude the use of the device in countries having different current requirements such as 110/120 voltage, unless the device is equipped to operate in the various current modes. Such a dual voltage feature (if available) would undoubtedly result in an even more expensive apparatus. Thus, as a result of the size, various tubes and pipes, internal parts, and electrical hook-ups of these prior art devices, they are also often difficult to clean and maintain, not to mention their obvious expense.

As previously mentioned, there is also the disadvantage of the prior art devices which uses steam in the frothing process that due to the water content in the froth, the froth has a very limited life. This is a serious drawback of these devices especially where it is desirable to prepare the froth in advance such as where it is to be served to guests during a later ocassion.

What is needed, and is lacking in the prior art, is a device to froth liquids, such as milk, which is simple to use, has no need for electricity or steam, and is relatively easy to clean and store.

SUMMARY OF THE INVENTION

The apparatus of the present invention allows for the quick and efficient frothing of liquids such as milk with the frothing of the liquid resulting from the agitation which results from the repeated and rapid pumping of the liquid by use of a manual plunger within a container of the liquid.

In accordance with one aspect of the present invention, an apparatus for frothing milk is provided which does not require the use of steam or electricity. Instead, as previously noted, the frother is provided with a container for holding the liquid, a plunger attached to a rod, and a lid for permitting a repeated and rapid agitation of the liquid by a pumping action. The up and down rapid pumping motion of the plunger through the liquid which is introduced into the container froths the milk without the need for electricity or steam.

In accordance with another aspect of the present invention, the container is made of glass or clear plastic in order to enable the user to see when the milk has been sufficiently frothed as well as gauge the amount of liquid being introduced into the container. The glass or plastic container also allows for easy cleaning of the device.

In accordance with yet another aspect of the present invention, the plunger and rod are completely removable from the container, thus further allowing for ease in cleaning the device as well as easy storage of all pieces of the frothing device.

Further objects and features of the invention will be from the specification, claims and the following description of the appended figures.

BRIEF DESCRIPTION OF THE DRAWINGS

FIG. 1 is a perspective view of a milk frother constructed according to the invention.

FIG. 2 is an elevational sectional view of a milk frother constructed according to the invention.

DETAILED DESCRIPTION OF THE PREFERRED EMBODIMENT

Figure 3:
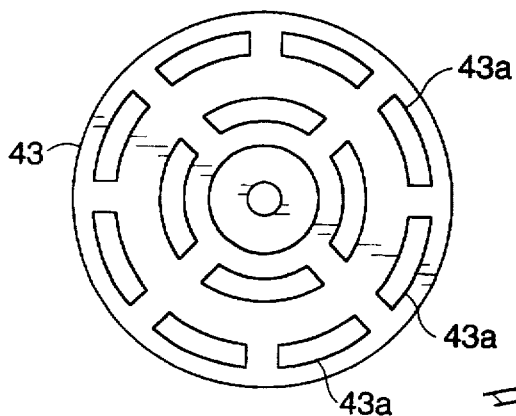
FIG. 3 is a top plan view taken along lines 3—3 of FIG. 2.
Figure 6:
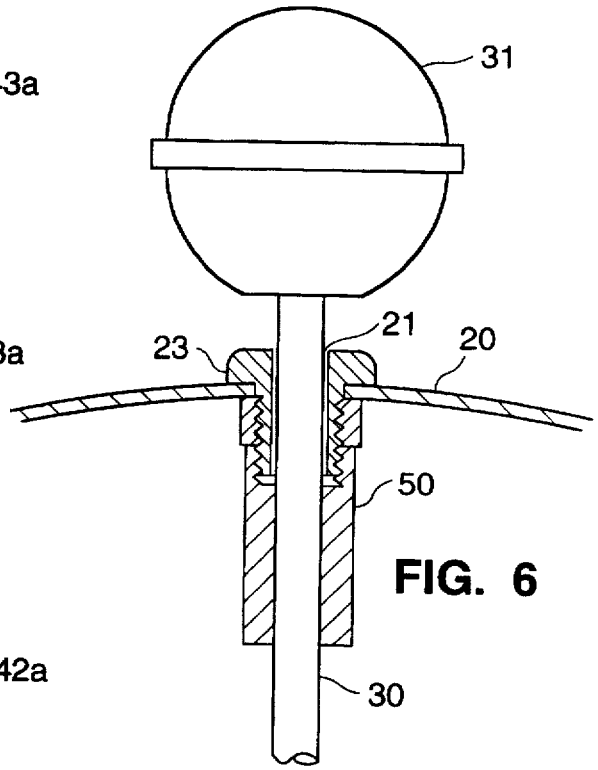
FIG. 6 is an enlarged fragmentary sectional view depicting the top section of the milk frother described by the current invention.

Referring to FIG. 1, the preferred embodiment of the inventive apparatus as a milk frother is shown, generally referred to with the reference numeral 1. Frother 1 has a container 10, a lid 20, a rod 30 and a plunger 40.

FIG. 2 illustrates an operational milk frother constructed in accordance with the present invention. The various aspects and features of the invention will be described with reference to FIG. 2 as well as FIGS. 3 through 8 which depict enlargements and cross sectional views of the various parts of the FIG. 2 apparatus.

Apparatus 1 consists primarily of container 10, lid 20, rod 30 and plunger 40 at the terminal end of the rod 30. Container 10 is preferably made of glass, and has an opening 11 at one end to receive a liquid. Lid 20 is adapted to fit securely about opening 11 onto container 10. An opening 21 is located in the centermost region of lid 20 and is adapated to receive a rod 30. Opening 21 has a diameter or width sufficient to receive and accomodate rod 30 and further allow for the up and down vertical motion of rod 30 through opening 21 when plunger 40 is being pumped to agitate the liquid contained in container 10.

Rod 30 further has an elongated vertical member 33 which extends through opening 21 with its bottom portion terminating in an externally threaded screw 32, and its top portion terminating in a handle 31. Rod 30 has a length which is sufficient to permit handle 31 to remain a distance above opening 21 and lid 20 at all times, even while the bottom end of the rod 30 is depressed in container 10 as during the downward pumping of rod 30.

Plunger 40 is screwably mounted to the terminal end of the rod 30. Plunger 40 further has a top plate 43, a bottom plate 41, a spring 49 and a screen 42 located between top plate 43 and bottom plate 41.

Plunger top plate 43 is best described with reference to FIGS. 3, 7 and 8. Top plate 43 has a diameter just slightly less than the diameter of container 10 since top plate 43 must be able to fit within container 10 and be permited to move up and down in a vertical motion when rod 30 is moved up and down through opening 21 in container 10. The sides of the top plate 43 are defined by an annular groove 48 which is adapted to receive a circular coil spring 49. Top plate 43 is further provided with an orifice 46 located about its centermost region for receiving the terminal end 32 of rod 30. Top plate 43 is further provided with a series of slots 43a through which air and liquid can pass.

Figure 4:
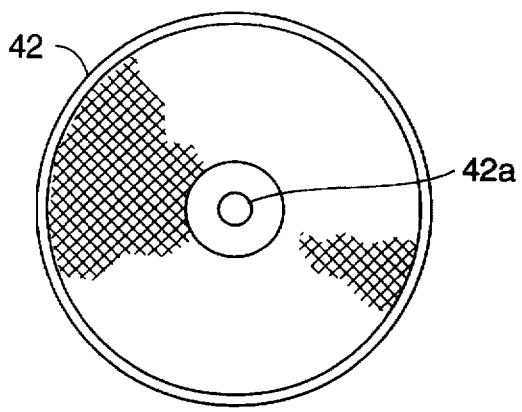
FIG. 4 is a plan view of the screen of the plunger section of the milk frother described by the present invention.
Figure 7:
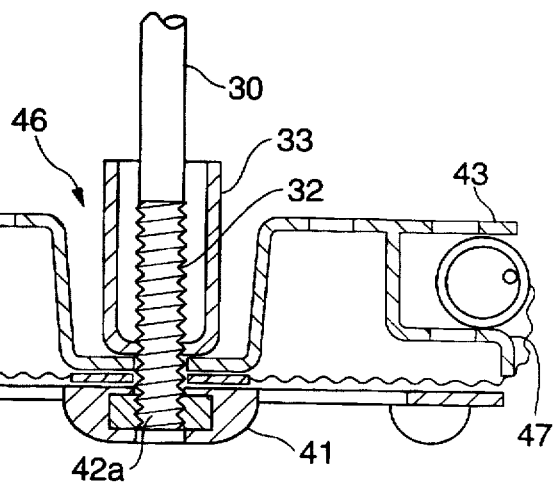
FIG. 7 is an enlarged fragmentary cross-sectional view of the plunger section of the milk frother described by the current invention.
Figure 8:
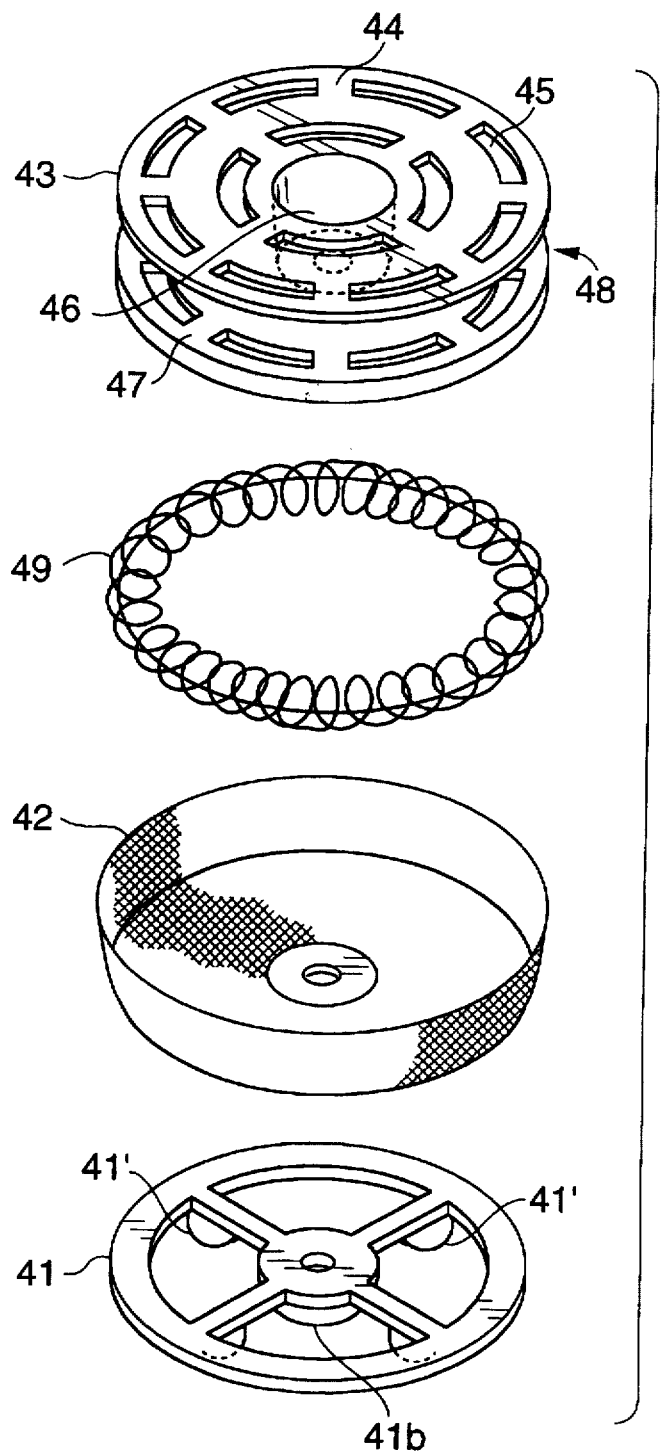
FIG. 8 is an exploded perspective view of the pieces of the plunger section of the milk frother described by the present invention.

Plunger 40 is further provided with a screen 42 which is located between top plate 43 and bottom plate 41 and which is best described with references to FIGS. 4, 7 and 8. Screen 42 is a circular disc of wire mesh and has a diameter which is preferably greater than the diameter of the container such that the edges of screen 40 may be draw up in the direction of top plate 43 when plunger 40 is assembled. As does top plate 43, screen 42 further has a central orifice 42a adequate to receive rod 30 and its terminal end 32 when plunger 40 is assembled in accordance with this inventon. In the present invention, the central orifice 42a in the screen 42 is reinforced so as to prevent ripping of the screen when the rod is passed through the orifice 42a during the repeated pumping of rod 30 through plunger 40.

Figure 5:
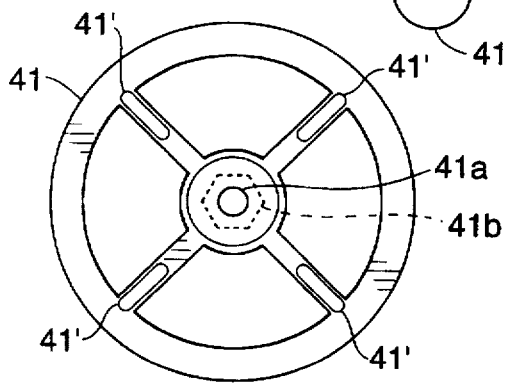
FIG. 5 is a bottom plan view taken along lines 5—5 of FIG. 2.

Plunger 40 further has a bottom plate 41 which is best understood from a discussion of FIGS. 5, 7 and 8. Bottom plate 41 also has an orifice 41a about its centermost region for screwably receiving rod 30 with terminal end 32. Bottom plate 41 has an outer diameter which is slightly less than the diameter of container 10, and a central nut 41b which is screwably connected to terminal end 32 of rod 30 to hold the bottom plate 41 and top plate 43 together when plunger 40 is assembled. Bottom plate 41 is further equipped with a number of feet-like protrusions 41' about its underside region for assisting in the agitation of the liquid when plunger 40 is in the pumping state and to further prevent the plunger from making actual contact with the bottom of container 10 when the apparatus is in operation when plunger 40 is fully depressed in container 10.

When assembled, plunger 40 has screen 42 placed between top plate 43 and bottom plate 41 with the edges of the screen 42 drawn up over the sides of the top plate 43, as shown in FIG. 7 (the screen is illustrated as wavy line 42 which is shown adjacent spring 49). Spring 49 (FIGS. 7 and 8) is further placed within the annular groove 48 of plate 41 and about screen 42 so as to bias screen 42 such that it will be proximate to, though not in sealable contact with the inner wall of container 10 and plunger 40 with plates 41 and 43, together with screen 42 and spring 49, will be permitted to slidably move vertically along the inner wall of container 10 when plunger 40 is in the pumping mode to agitate the liquid in container 10. Lid 20 has a nut 50 securely attached to the under side of the lid 20 about opening 21, such that when nut 50 is securely in place none of the liquid in container 10 will be permitted to escape even when the plunger is in the rapidly pumping mode.

When in use, container 10 is filled approximately one-third the height of container 10 with a liquid, such as milk. Lid 20 is placed on top of container 10.

In the preferred embodiment of the invention, the height of container 10 is approximately twice the diameter of container 10. With these ratios, container 10 has a relatively short radius compared to its height which would result in the liquid becoming frothed with fewer pumps of plunger 40 through the liquid than would be required were the liquid to occupy a larger area as would be the case where the radius of container 10 was larger.

Furthermore, in the preferred embodiment of the invention where milk is the liquid to be frothed, it has been determined that the use of nonfat milk is preferable to lowfat or whole milk, although all such liquids may be frothed with the inventive apparatus. One further advantage of the apparatues of the invention is that the milk or other liquid to be frothed may be introduced into container 10 either cold, at room temperature, or heated. However, it may be preferable to use cold milk or milk which is at room temperature since in this way the container will be more comfortable to hold or touch during the pumping and frothing process. If cold milk is used, but hot froth is desired, the resulting froth may be quickly heated in a microwave or otherwise.

In a further embodiment of the present invention, container 10 is also provided with a phlanged lip 12 and a pour spout 11a which allows for easy pouring of the resulting foam and residual liquid after the frothing procedure has been completed. The phlanged lip 12 allows for easy dispensing of the foam from any angle, while pour spout 11a permits easy pouring of any residual liquid from container 10.

The invention as set forth herein is also for a new and improved method for frothing a liquid which does not require the use of the traditional steam previously thought needed for this process. The new and improved method of the invention is directed to the use of the apparatus which is generally illustrated in FIGS. 1 and 2 to froth liquids. In the new and improved method of the invention, a liquid is introduced into a container 10 which has been equipped with a plunger of the type generally illustrated by reference numeral 40, including rod 30, in a device 1 (one embodiment of which is made in accordance with this invention and described above) for repeatedly and rapidly pumping the liquid several times in a vertical motion until the liquid is aerated and becomes frothed.

The method of the invention includes use of a plunger 40 which may be moved in a vertical movement with rapid successions through container 10 of liquid until the desired degree of frothing has resulted. Container 10 for the liquid is preferably made of glass and plunger 40 has a top plate 43 and a bottom plate 42 between which is placed a screen 42 through which the liquid can pass and a spring 49 for biasing the screen to be in close contact with the inner wall of container 10 such that when plunger 40 is pumping vertically through the container in a rapid movement plunger 40 will slideably move along the inner wall of container 10 to sufficeiently agitate the liquid until it has reached the desired froth consistency. Where the container for the liquid has a height which is approximately twice the diameter of the container, the liquid, particularly nonfat milk, can be expected to reach the desired froth consistency after about 20 pumps of the plunger through the liquid.

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims and their equivalents. Thus, this invention is limited only by the following claims and their equivalents.

What is claimed as the invention is:

1. A method for aerating a liquid comprising the steps of:

providing a container characterized by a height and a diameter, the height being at least two times the diameter;

placing the liquid into the container;

introducing a rod terminating in a plunger into the liquid in said container so that the plunger contacts the liquid, the plunger comprising;
a plunger body having a circumference;
a screen; and
a spring positioned about the circumference of the plunger body such that the spring is biased to hold the screen in place in contact with, though not sealably connected to, the container; and pumping the plunger by moving the rod in a vertical motion such that the plunger passes through the liquid in the container for a time sufficient to aerate the liquid until it takes on a frothy or foamy consistency.

2. A method according to claim 1, wherein the container is made of glass.

3. A method according to claim 1, wherein the liquid is a milk based product.

4. A method according to claim 3 wherein the pumping step includes pumping the plunger a number of times less than or equal to twenty times, and wherein the liquid is aerated within the number of times that the plunger is pumped.

5. A method according to claim 1, wherein the plunger body comprises:
a base plate having a plurality of feet-like protrusions; and
said top plate having the spring positioned about the circumference of said top plate such that the spring is biased to hold the screen in place.

6. A method according to claim 5, wherein the screen consists of a fine wire mesh.

7. A method according to claim 1, wherein the pumping step includes pumping the plunger a number of times less than or equal to twenty times, and wherein the liquid is aerated within the number of times that the plunger is pumped.

* * * * *